No. 609,508. Patented Aug. 23, 1898.
C. M. HANDOVER.
CLOTHING PROTECTOR FOR BICYCLES.
(Application filed May 27, 1896.)
(No Model.)
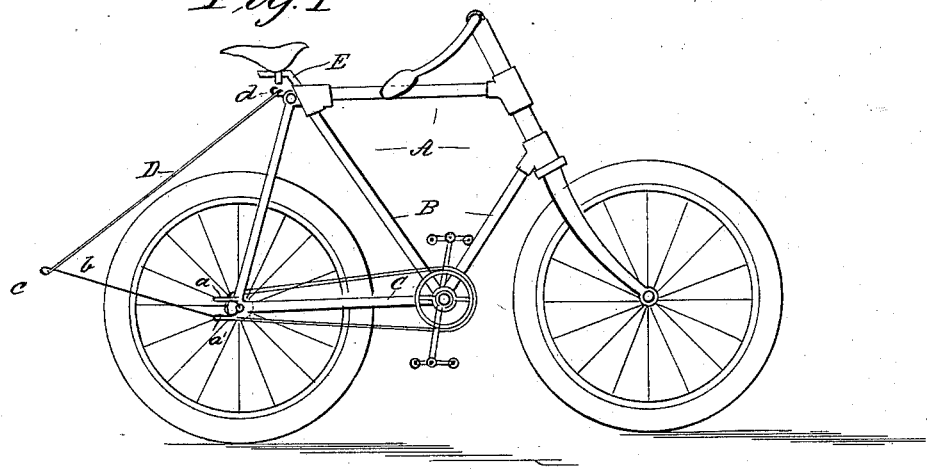
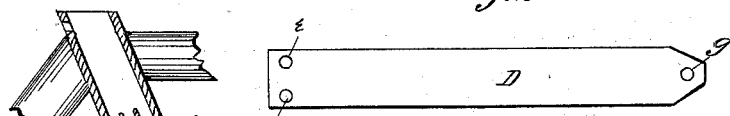
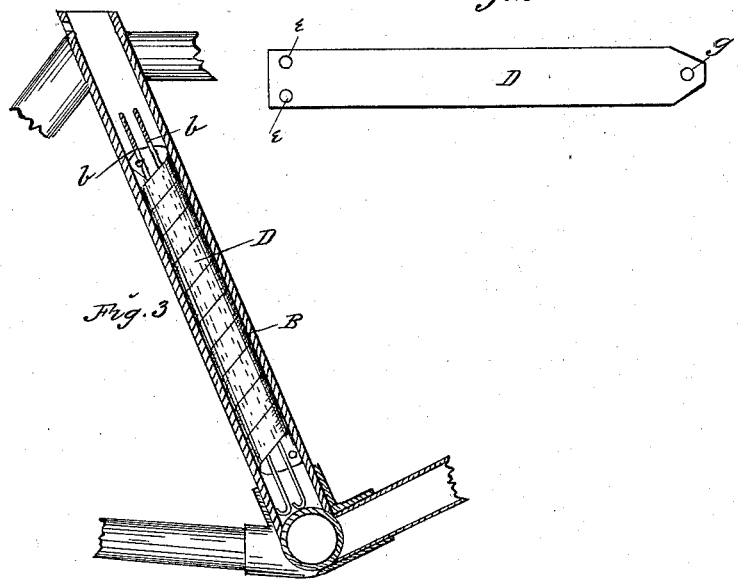
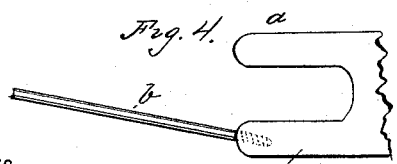
WITNESSES
INVENTOR
Charles M. Handover.
BY Edgar Tate & Co
ATTORNEYS.

UNITED STATES PATENT OFFICE.

CHARLES M. HANDOVER, OF NEW YORK, N. Y.

CLOTHING-PROTECTOR FOR BICYCLES.

SPECIFICATION forming part of Letters Patent No. 609,508, dated August 23, 1898.

Application filed May 27, 1896. Serial No. 593,233. (No model.)

*To all whom it may concern:*

Be it known that I, CHARLES M. HANDOVER, a citizen of the United States, and a resident of New York, (Brooklyn,) in the county of Kings and State of New York, have invented certain new and useful Improvements in Clothing-Protectors for Bicycles, of which the following is a specification, reference being had to the accompanying drawings, forming a part thereof, in which similar letters of reference indicate corresponding parts.

This invention relates to an improvement in bicycles or similar vehicles, and has for its object to provide an appurtenance by means of which the clothing of the rider may be protected from the dirt or moisture thrown forward by the centrifugal action of the tire of the rear wheel.

In the drawings herewith forming part of this specification, Figure 1 is an elevated side view of a bicycle equipped with my improved device. Fig. 2 is a plan view of a portion of said device. Fig. 3 is a sectional view showing how the device may be carried in compact form when not required and invisible when not in use, and Fig. 4 is a further detail view of a portion of the mechanism herein described.

In the practice of my invention I provide a bicycle A with the ordinary diamond-shape frame, and extending backwardly of the hub of the rear wheel and upon each side of the same are two upper and lower lugs $a$ and $a'$, formed integrally with or connected with the horizontal tubing between the pedal-shaft and the hub of the rear wheel, and formed within the lower prong $a'$ of the U-shape projection aforesaid is an interiorly-threaded aperture inclined upwardly, which is adapted to receive the screw-threaded end of the rod $b$, which is projected outwardly and inclined upwardly to a point to the rear of the tire of the rear wheel and having its end bent downwardly, forming a hook $c$. Upon the opposite side of the rear wheel a similar rod is attached and projected. Projecting backwardly from the upper end of the rear tube and adjacent to and beneath the saddle is a finger $d$, provided with an upwardly-hooked end.

I also provide a strip D, composed of either flexible, partly flexible, or inflexible material—such as cloth, metal, or rubber—which is provided with apertures $e$ $e$ at one end and with a single aperture $g$ at the opposite end, the corners adjacent to the single aperture being cut away, as shown in Fig 2, and this strip D is adapted to extend from the hooks $c$ to the hook $d$ and to be held taut between said points either by the flexibility of the material composing the same, or, if not of flexible material, by the resiliency of the rods $b$.

The tubing B, which supports the post E, is adapted to receive the strip D and the rods $b$, as shown by Fig. 3, when the device is removed, and the said rods can be readily removed and wrapped within the strip D if the strip is of rubber or cloth.

The operation of my device is as follows: The two rods $b$, extending from the lower lugs $a'$ on each side of the tube of the rear wheel, or otherwise secured to the frame, are connected with the strip D by having the ends of said rods hooked within the apertures $e$, and opposite end of strip D is then attached to the hook $d$ or otherwise attached.

The device may be quickly removed by unscrewing the rods $b$, unhooking the strip D, and after wrapping the rods in said strip the whole device may be inserted, as aforesaid, in the tubing B.

It is evident that the scope of my invention will allow considerable modification.

What I claim, however, and desire to secure by Letters Patent, is as follows:

The herein-described clothing-protector for a bicycle, comprising the combination with a bicycle of lugs $a'$, each having a screw-threaded aperture, a rod $b$, on one side having a hook $c$, a similarly-attached rod on the other side of the drive-wheel, a finger $d$, provided with a hooked end, a strip D, having apertures $e$, $e$, all combined substantially as shown and described and for the purpose set forth.

In testimony that I claim the foregoing as my invention I have signed my name, in presence of the subscribing witnesses, this 23d day of May, 1896.

CHARLES M. HANDOVER.

Witnesses:
C. GERST,
M. A. KNOWLES.